(12) United States Patent
Maier et al.

(10) Patent No.: US 6,516,724 B2
(45) Date of Patent: Feb. 11, 2003

(54) GAS GENERATOR

(75) Inventors: Thomas Maier, Engelsberg (DE); Ernst Enzmann, Grassau (DE)

(73) Assignee: TRW Airbag Systems GmbH & Co. KG, Aschau/Inn (DE)

( * ) Notice: Subject to any disclaimer, the term of this patent is extended or adjusted under 35 U.S.C. 154(b) by 0 days.

(21) Appl. No.: 09/994,152

(22) Filed: Nov. 26, 2001

(65) Prior Publication Data

US 2002/0062758 A1 May 30, 2002

(30) Foreign Application Priority Data

Nov. 27, 2000 (DE) ..................... 200 20 098 U

(51) Int. Cl.⁷ ................... F42B 3/182; B60R 21/32
(52) U.S. Cl. .................... 102/202.1; 102/289; 102/530; 280/735
(58) Field of Search ............... 102/288, 289, 102/530, 531, 202.1; 280/735, 737, 741

(56) References Cited

U.S. PATENT DOCUMENTS

| 3,420,174 A | * | 1/1969 | Potter .................. 102/202.1 X |
| 3,765,334 A | * | 10/1973 | Rentz et al. ......... 102/202.1 X |
| 3,797,393 A | * | 3/1974 | Marchandise et al. ... 102/202.1 X |
| 3,848,695 A | * | 11/1974 | Lacaze, Jr. ............ 280/150 AB |
| 4,167,276 A | * | 9/1979 | Bell et al. .................... 280/731 |
| 4,271,453 A | * | 6/1981 | Yajima et al. ....... 102/202.3 X |
| 6,234,522 B1 | * | 5/2001 | Albrecht et al. ............ 280/737 |
| 6,234,524 B1 | * | 5/2001 | Patrickson et al. .. 102/202.1 X |
| 6,254,128 B1 | * | 7/2001 | Albrecht et al. ............ 280/737 |
| 6,272,993 B1 | * | 8/2001 | Cook et al. .......... 102/202.1 X |
| 6,374,609 B1 | * | 4/2002 | Evans et al. ............ 102/531 X |
| 6,379,627 B1 | * | 4/2002 | Nguyen et al. ......... 280/741 X |
| 6,412,817 B2 | * | 7/2002 | Patrickson et al. .. 102/202.1 X |

* cited by examiner

Primary Examiner—Peter A. Nelson
(74) Attorney, Agent, or Firm—Tarolli, Sundheim, Covell, Tummino & Szabo L.L.P.

(57) ABSTRACT

The invention relates to a gas generator comprising a generator housing which has a base part, and an electric igniter which has a rear side, is fastened in the base part and has connection lines on the rear side. The gas generator further comprises a propellant charge in the generator housing, the propellant charge being provided outside the igniter and an insulating bush surrounding the connection lines and fastened to the generator housing. The insulating bush consists of plastic and contains electrically conductive particles.

5 Claims, 1 Drawing Sheet

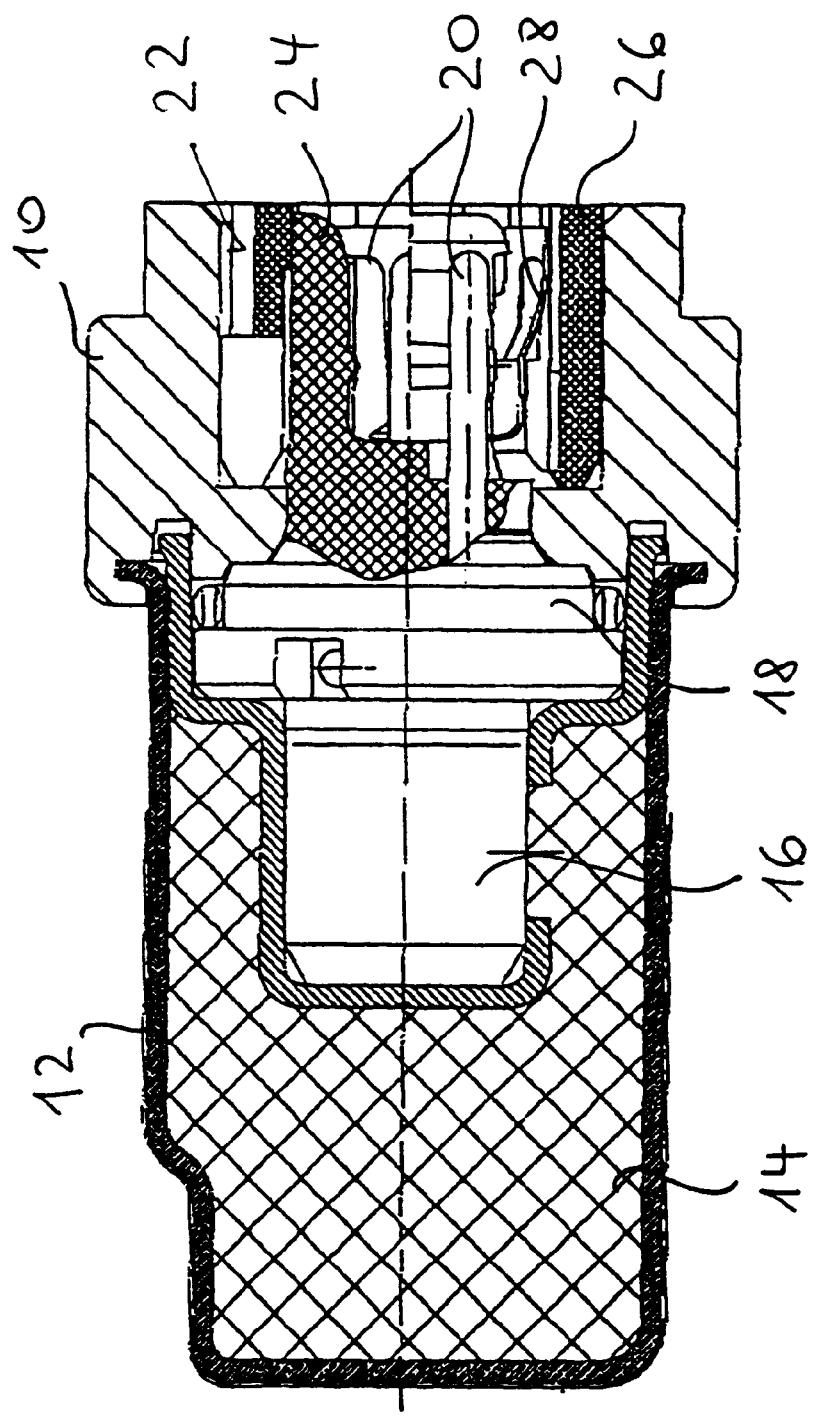

GAS GENERATOR

TECHNICAL FIELD

The invention relates to a gas generator.

BACKGROUND OF THE INVENTION

In gas generators, in particular for vehicle occupant restraint systems, it must be prevented that the igniter or the entire gas generator is charged electrostatically to such an extent that an electrostatic discharge can occur, having the consequence of an activation of the gas generator being in the installed state. For this, some solutions have been considered with incorporated so-called ESD protection elements such as capacitors, varistors or the like. The accommodating of these additional elements in the igniter is often costly, because these elements must be arranged on the connection lines so as to be protected against mechanical stress.

BRIEF SUMMARY OF THE INVENTION

The invention provides a gas generator with a simple, inexpensive protection against electrostatic discharge, in which the integration into the gas generator is possible in a simple manner.

This is achieved in a gas generator which comprises a generator housing which has a base part, and an electric igniter which has a rear side, is fastened in the base part and has connection lines on the rear side. The gas generator further comprises a propellant charge in the generator housing, the propellant charge being provided outside the igniter and an insulating bush surrounding the connection lines and fastened to the generator housing. The insulating bush consists of plastic and contains electrically conductive particles. The electrically conductive particles must be contained to such an extent in the plastic and be selected such that the contact resistance of the insulating bush is sufficiently reduced, so that the electrostatic discharge does not take place directly in the igniter. Rather, through the invention, on discharge a spark shall be able to jump more easily between the short-circuiting spring possibly provided in the insulating bush (during shipping of the gas generator, without a connection plug put on) or the connection line (in the installed state of the gas generator) and the generator housing to which also the insulating bush, provided with electrically conductive particles, belongs. The electric igniter is thereby better protected from spurious releases. Additional elements to the ESD protection can thereby be dispensed with.

The connection lines are preferably pins projecting from the rear side of the igniter, which pins are surrounded by the insulating bush. The insulating bush is preferably accommodated in a recess in the gas generator housing.

BRIEF DESCRIPTION OF THE DRAWING

FIG. 1 shows a longitudinal sectional view through an embodiment of the gas generator according to the invention.

DETAILED DESCRIPTION OF THE PREFERRED EMBODIMENT

FIG. 1 shows a gas generator which has a generator housing, which consists of a base part 10 and a cup-shaped container 12 connected therewith. In the generator housing a propellant charge 14 is housed, into which an electric igniter 16 projects for activation of the propellant charge 14. The igniter likewise has a base which is designated by 18 and lies against the base part 10.

On the rear side from the base 18 connection lines in the form of two pins 20 project out from the igniter 16 and extend into an opening 22 in the base part 10. One of two latching noses fastened to the base 18 is designated by 24, which noses serve for fastening a connection plug which is not shown.

An insulating bush 26 of plastic, housed in the opening 22, surrounds the connection lines 20 and the latching noses 24. The insulating bush is preferably fastened to the base part 10 by means of a latching connection. A short-circuiting spring 28 is housed in addition in the insulating bush 26. During shipping (corresponding state shown in FIG. 1), the short-circuiting spring connects the connection lines 20 with each other and short-circuits them, so that no spurious release can occur, e.g. through induction during transportation. When the plug, which is not shown, is inserted on the rear side into the gas generator, it presses the short-circuiting spring 28 away, so that the short-circuit between the connection lines 20 is canceled.

The insulating bush 26 contains electrically conductive particles, preferably so-called conductive pigments, so that the electrical resistance of the insulating bush is greatly reduced. Minatec® 40 CM of Merck AG comes into consideration, for example, as conductive pigment. Also a painting of the insulating bush with such conductive pigments would be possible, in order to reduce the resistance of the insulating bush 26.

Through the special construction of the insulating bush, a spark jump will occur on discharging more easily between the short-circuiting spring 28 and the insulating bush 26, which so to speak forms a part of the gas generator housing—in relation to the transportation state shown with short-circuited igniter—than in an embodiment with an insulating bush without conductive particles. In the installed state, when the short-circuiting spring 28 does not short-circuit the connection lines 20, a discharge can occur due to the particular insulating bush more easily between the connection lines 20 and the insulating bush 26, which can also be regarded in this state of the gas generator as a radial extension of the generator housing.

What is claimed is:

1. A gas generator, comprising
a generator housing which has a base part,
an electric igniter which has a rear side, is fastened in said base part and has connection lines on said rear side,
a propellant charge in said generator housing, said propellant charge being provided outside said igniter and
an insulating bush surrounding said connection lines and fastened to said generator housing,
said insulating bush consisting of plastic and containing electrically conductive particles.

2. The gas generator according to claim 1, wherein said particles are conductive pigments.

3. The gas generator according to claim 1, wherein said insulating bush contains a shortcircuiting spring for short-circuiting said connection lines.

4. The gas generator according to claim 1, wherein said generator housing has an opening in which said insulating bush is accommodated.

5. The gas generator according to claim 1, wherein said connection lines are pins projecting from said rear side of said igniter.

* * * * *